(12) United States Patent
Ito et al.

(10) Patent No.: US 10,717,065 B2
(45) Date of Patent: Jul. 21, 2020

(54) WATER ABSORPTION TREATMENT MATERIAL

(71) Applicant: DAIKI CO., LTD., Tokyo (JP)

(72) Inventors: Hiroshi Ito, Tokyo (JP); Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 409 days.

(21) Appl. No.: 15/634,060

(22) Filed: Jun. 27, 2017

(65) Prior Publication Data
US 2017/0291159 A1     Oct. 12, 2017

Related U.S. Application Data

(63) Continuation of application No. PCT/JP2016/057085, filed on Mar. 8, 2016.

(30) Foreign Application Priority Data

Mar. 25, 2015 (JP) .................. 2015-061989

(51) Int. Cl.
| | | |
|---|---|---|
| B01J 20/28 | (2006.01) |
| B29C 48/04 | (2019.01) |
| B29C 48/21 | (2019.01) |
| B29C 48/00 | (2019.01) |
| A01K 1/015 | (2006.01) |
| B29C 48/30 | (2019.01) |
| B29C 48/20 | (2019.01) |
| B29C 48/19 | (2019.01) |
| B01J 20/30 | (2006.01) |
| B29B 9/12 | (2006.01) |
| B29B 9/06 | (2006.01) |
| B29B 9/16 | (2006.01) |
| B29C 48/345 | (2019.01) |
| B29K 29/00 | (2006.01) |

(52) U.S. Cl.
CPC ....... B01J 20/28016 (2013.01); *A01K 1/0152* (2013.01); *A01K 1/0155* (2013.01); *B01J 20/3007* (2013.01); *B01J 20/3028* (2013.01); *B29C 48/0022* (2019.02); *B29C 48/04* (2019.02); *B29C 48/19* (2019.02); *B29C 48/20* (2019.02); *B29C 48/21* (2019.02); *B29C 48/304* (2019.02); *B29B 9/06* (2013.01); *B29B 9/12* (2013.01); *B29B 2009/163* (2013.01); *B29C 48/30* (2019.02); *B29C 48/345* (2019.02); *B29K 2029/04* (2013.01); *B29K 2995/0092* (2013.01)

(58) Field of Classification Search
CPC .. B01J 20/28; B01J 20/28016; B01J 20/3007; B01J 20/3028; B29C 48/0022; B29C 48/04; B29C 48/21; B29K 2029/04; B29K 2995/0092
USPC ........................................................ 502/402
See application file for complete search history.

(56) References Cited

U.S. PATENT DOCUMENTS

2008/0251027 A1    10/2008   Kirsch et al.

FOREIGN PATENT DOCUMENTS

| JP | S54-049989 A | 4/1979 |
| JP | H10-262482 A | 10/1998 |
| JP | 2004-121036 A | 4/2004 |
| JP | 2007-190026 A | 8/2007 |
| JP | 2014-183778 A | 10/2014 |
| JP | 2014-183835 A | 10/2014 |

OTHER PUBLICATIONS

May 24, 2016 Written Opinion issued in International Patent Application No. PCT/JP2016/057085.
May 24, 2016 Search Report issued in International Patent Application No. PCT/JP2016/057085.
Jul. 31, 2018 Extended European Search Report issued in European Patent Application No. 16768396.0.
Nov. 7, 2019 Office Action issued in European Patent Application No. 16768396.0.

*Primary Examiner* — Edward M Johnson
(74) *Attorney, Agent, or Firm* — Oliff PLC

(57) ABSTRACT

Provided is a water absorption treatment material and a method for manufacturing the same, according to which a clump can be formed after use without incurring a decrease in water absorptivity. A water absorption treatment material includes a granular core portion and an embedded portion. A recessed portion is formed on the surface of the granular core portion. The embedded portion is provided in the recessed portion of the granular core portion. The embedded portion contains an adhesive material.

10 Claims, 16 Drawing Sheets

WATER ABSORPTION TREATMENT MATERIAL

CROSS REFERENCE TO RELATED APPLICATION

This is a Continuation of International Application No. PCT/JP2016/057085 filed Mar. 8, 2016, which claims the benefit of Japanese Application No. 2015-061989 filed Mar. 25, 2015. The contents of these applications are hereby incorporated by reference in their entirety.

TECHNICAL FIELD

The present invention relates to a water absorption treatment material that absorbs a liquid such as human or animal excreta, and a method for manufacturing the same.

BACKGROUND ART

Patent Document 1 discloses an excreta treatment material, which is a type of water absorption treatment material. The excreta treatment material is provided with a granular core portion and a coating layer portion that covers the granular core portion. The coating layer portion contains an adhesive material and has a function of adhering pieces of the excreta treatment material together, which have absorbed excreta during use. Accordingly, a clump composed of multiple pieces of the excreta treatment material is formed after use.

CITATION LIST

Patent Document

Patent Document 1: JP 2007-190026A

SUMMARY OF INVENTION

Technical Problem

Thus, the coating layer portion contributes to forming a clump of the water absorption treatment material after use. However, on the other hand, a since the coating layer portion is provided so as to cover the granular core portion, a case is prevented in which the liquid such as excreta rapidly reaches the granular core portion. This has caused the water absorptivity to decrease in the conventional water absorption treatment material.

Solution to the Problem

The present invention has been made in view of the foregoing circumstances and aims to provide a water absorption treatment material and a method for manufacturing the same, according to which it is possible to form a clump after use, without incurring a decrease in water absorptivity.

The water absorption treatment material according to the present invention includes: a granular core portion having a recessed portion on its surface; and an embedded portion that is provided in the recessed portion and contains an adhesive material.

The water absorption treatment material is provided with an embedded portion that contains an adhesive material. Accordingly, when a piece of the water absorption treatment material absorbs a liquid, it adheres to another piece of the water absorption treatment material and forms a clump. Also, the embedded portion is provided in a recessed portion of the granular core portion. For this reason, the liquid can rapidly reach the granular core portion regardless of the existence of the embedded portion.

Also, a method for manufacturing a water absorption treatment material according to the present invention includes a core portion forming step of forming a granular core portion having a recessed portion on its surface; and an embedded portion forming step of forming an embedded portion containing an adhesive material in the recessed portion.

In the manufacturing method, an embedded portion that contains an adhesive material is formed. Accordingly, when a piece of the manufactured water absorption treatment material absorbs a liquid, it adheres to another piece of the water absorption treatment material and forms a clump. Also, the embedded portion is provided in a recessed portion of the granular core portion. For this reason, in the manufactured water absorption treatment material, the liquid can rapidly reach the granular core portion regardless of the existence of the embedded portion.

Advantageous Effects of Invention

The present invention realizes a water absorption treatment material and a method for manufacturing the same, according to which it is possible to form a clump after use without incurring a decrease in water absorptivity.

DESCRIPTION OF EMBODIMENTS

Figure 1:
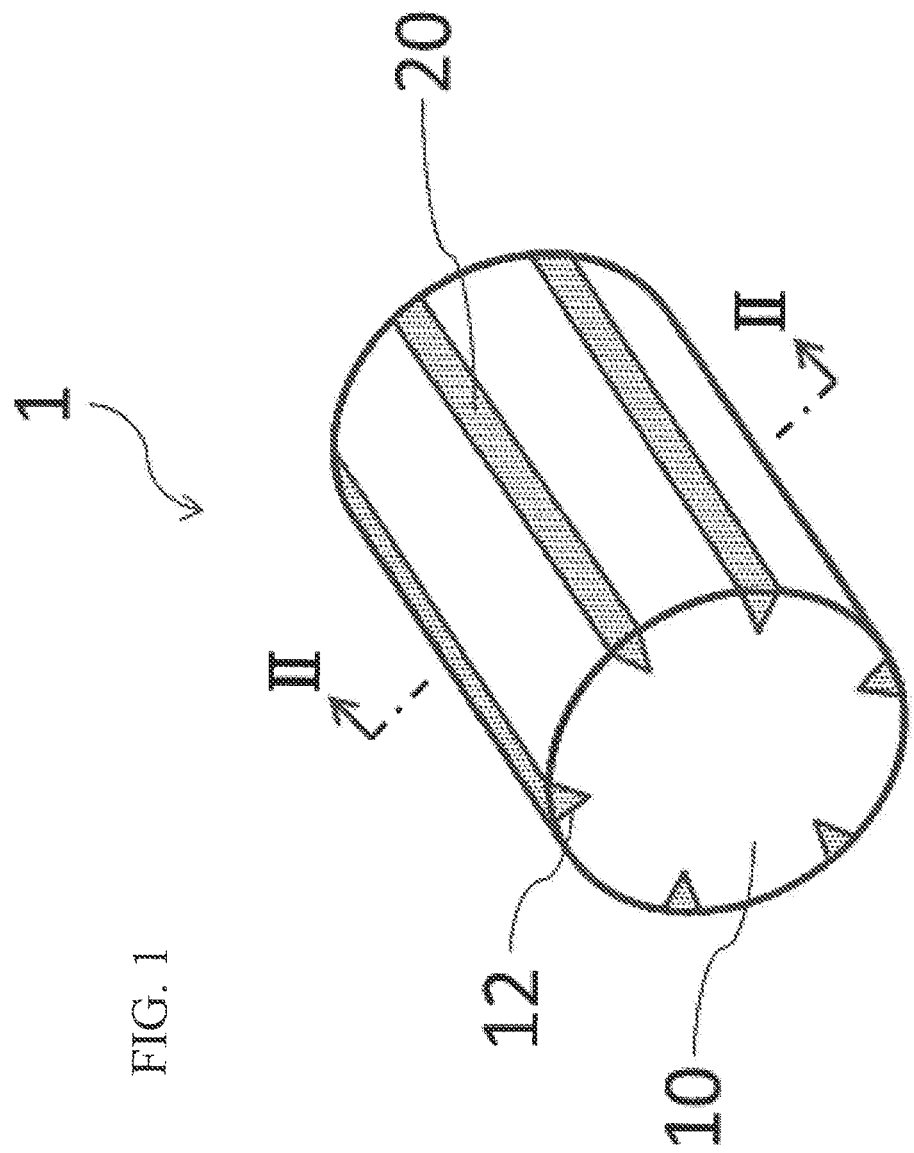
FIG. 1 is a perspective view showing an embodiment of a water absorption treatment material according to the present invention.

Hereinafter, an embodiment of the present invention will be described in detail with reference to the drawings. Note that in the description of the drawings, like elements are denoted by like reference numerals and redundant description thereof is not included.

Figure 2:
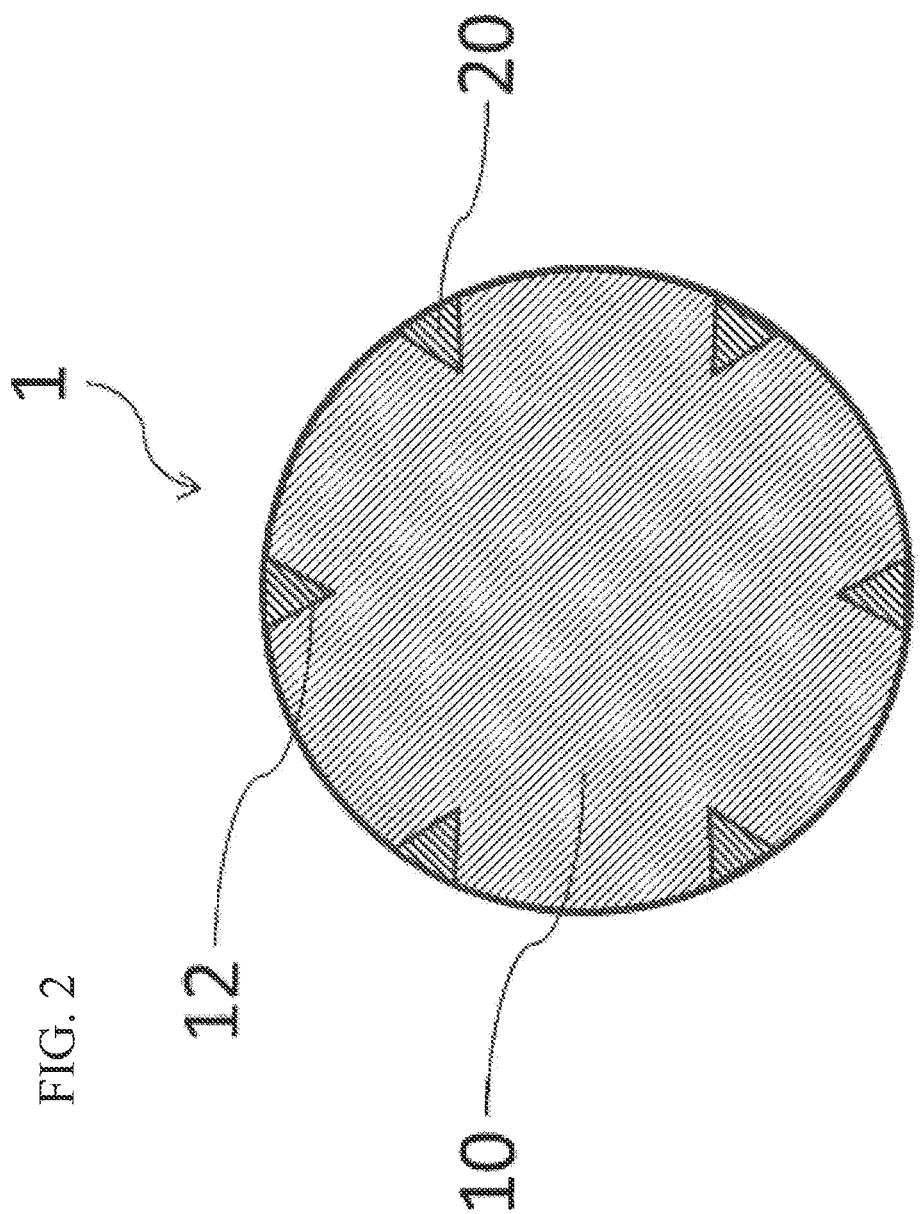
FIG. 2 is a cross-sectional view taken along line II-II in FIG. 1.

FIG. 1 is a perspective view showing an embodiment of a water absorption treatment material according to the present invention. Also, FIG. 2 is a cross-sectional view taken along line in FIG. 1. A water absorption treatment material 1 is a water absorption treatment material that absorbs a liquid, and includes a granular core portion 10 and embedded. portions 20. The water absorption treatment material 1 is an excreta treatment material for a pet such as a cat or a dog, for example.

The granular core portion 10 is formed into a granular shape in the present embodiment, the granular core portion 10 is approximately cylindrical. The granular core portion 10 contains a water-absorptive material and has a function of absorbing and retaining liquid, such as excreta. For example, paper, tea grounds, plastic, or bean curd lees can be used as the water-absorptive material. The water-absorptive material is preferably the main material of the granular core portion 10. Here, the main material of the granular core portion 10 refers to a material that constitutes the granular core portion 10 and has the largest weight ratio in the granular core portion 10.

Paper refers to a material mainly composed of pulp. Examples of paper include recycled vinyl chloride wallpaper (paper obtained by recycling vinyl chloride wallpaper), fluff pulp, papermaking sludge (including pulp sludge), and the like, in addition to normal paper, it is also possible to use recycled paper diapers (plastic obtained by recycling paper diapers) as the plastic, for example. The bean curd lees are preferably dried bean curd lees.

Figure 3:
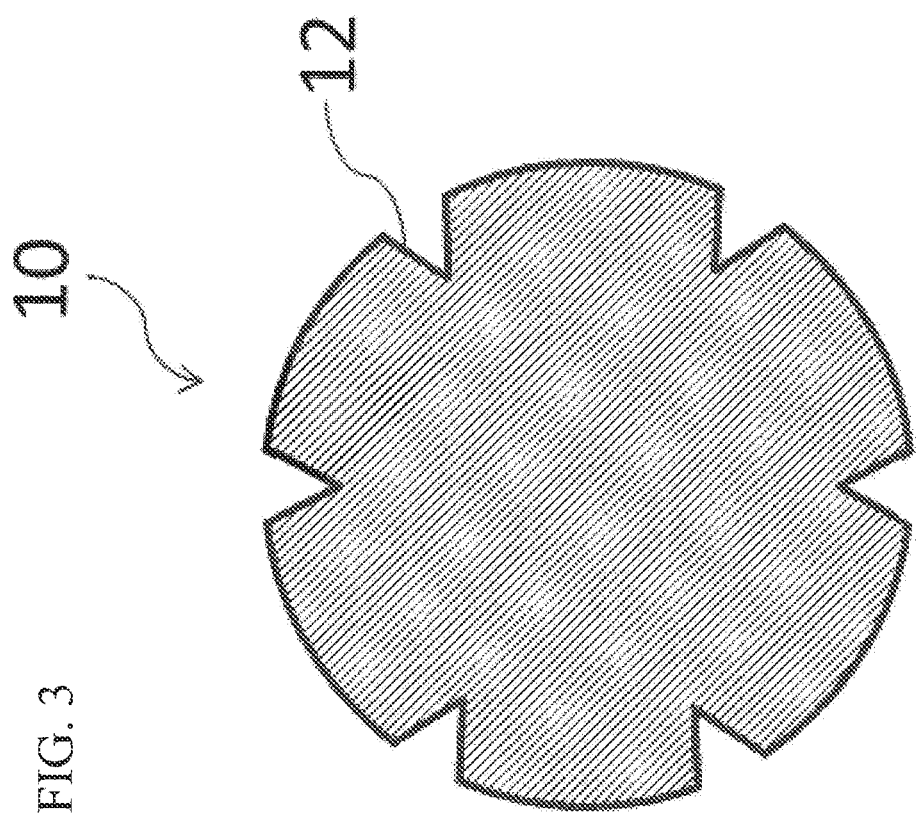
FIG. 3 is a cross-sectional view showing a granular core portion in the water absorption treatment material shown in FIG. 1.

As shown in FIG. 3, recessed portions 12 are formed on the surface of the granular core portion 10. FIG. 3 shows a cross section corresponding to FIG. 2. The recessed portions 12 are formed into groove shapes and extend in the length direction of the granular core portion 10 (see FIG. 1). The recessed portions 12 extend over the entire length direction of the granular core portion 10. In the present embodiment, multiple (specifically, six) recessed portions 12 are provided. The recessed portions 12 are provided regularly on the surface of the granular core portion 10. Specifically, the six recessed portions 12 are provided at approximately equal intervals in the circumferential direction of the granular core portion 10.

As will be described later, the recessed portions 12 are intentionally formed on the surface of the granular core portion 10. Here, the "intentionally-formed" recessed portions 12 refer to recessed portion 12 that are formed using a method according to which it is possible to control the shapes, sizes, and positions of the recessed portions 12.

On the surface of the granular core portion 10, the surface area ratio of the portions at which the recessed portions 12 are provided with respect to the entire surface is preferably 10% or more and 90% or less, and more preferably 20% or more and 60% or less.

As shown in FIGS. 1 and 2, the embedded portions 20 are provided in the recessed portions 12 of the granular core portion 10. The embedded portions 20 are provided so as to completely fit into the recessed portions 12. In other words, the embedded portions 20 are provided such that they do not protrude to the outside of the recessed portions 12. Also, the embedded portions 20 are provided in approximately the entirety of each recessed portion 12. That is, the embedded portions 20 are provided so as to fill approximately the entirety of each recessed portion 12. In the portions at which no recessed portion 12 is provided, the granular core portion 10 is exposed to the outside of the water absorption treatment material 1.

The embedded portions 20 contain an adhesive material. The embedded portions 20 have a function of adhering pieces of the water absorption treatment material 1 together, which have absorbed liquid during use. For example, water-absorptive polymer, starch, CMC (carboxymethyl cellulose), PVA (polyvinyl alcohol), or dextrin can be used as the adhesive material. The embedded portions 20 may be constituted by containing the above-described water absorptive material in addition to the adhesive material.

Next, an example of a method for manufacturing the water absorption treatment material 1 will be described as an embodiment of a method for manufacturing a water absorption treatment material according to the present invention. The manufacturing method includes a core portion forming step and an embedded portion forming step.

The core portion forming step is a step of forming the granular core portion 10, which has the recessed portions 12 on its surface. In this step, the material (core portion material) constituting the granular core portion 10 is shredded using a pulverizer or the like, and the resulting material is introduced into a mixer and mixed together. Then, water is added according to need, and thereafter the core portion material is subjected to extrusion granulation (granulation step).

Figure 4:
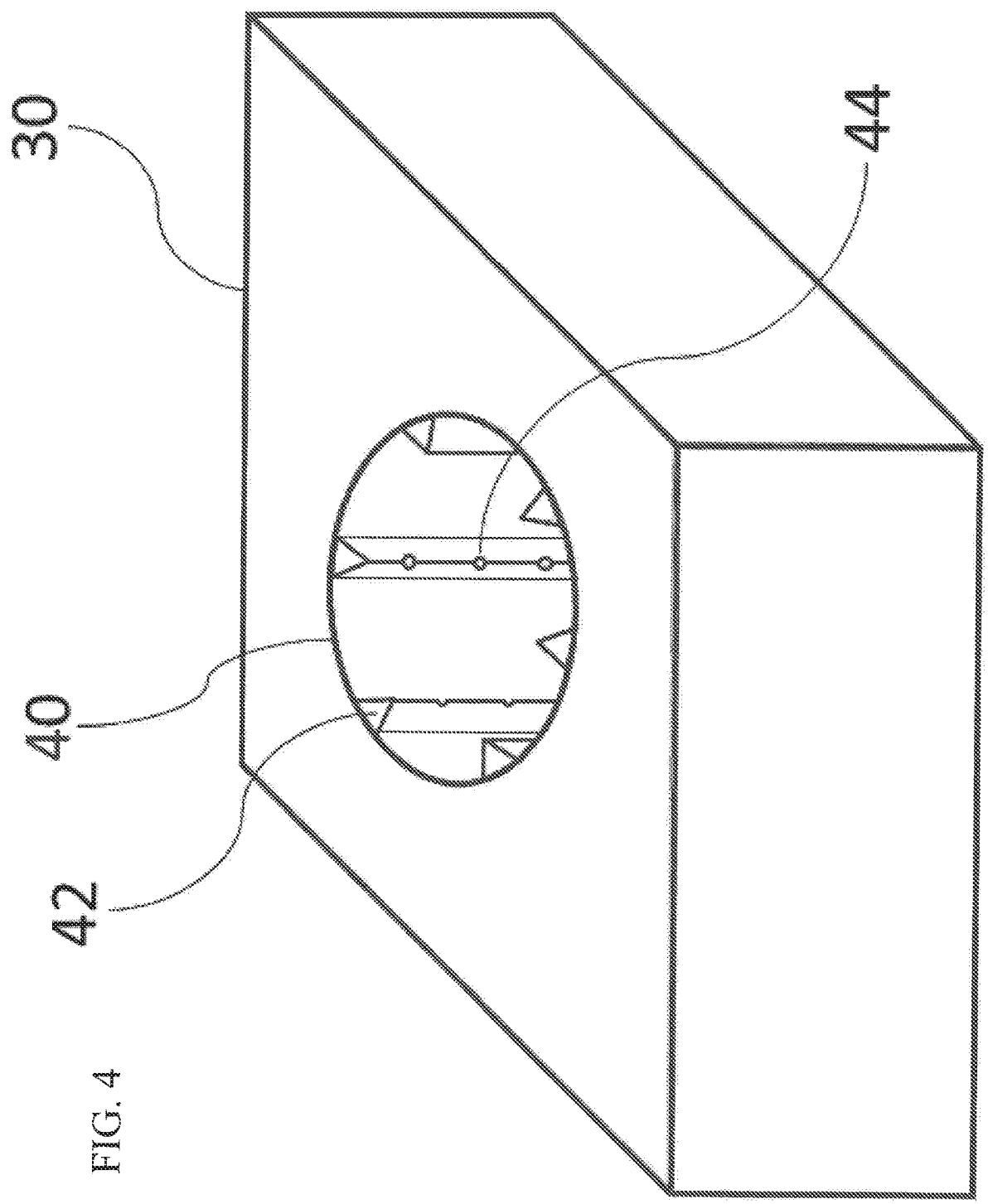
FIG. 4 is a perspective view showing a portion of a die used to manufacture the water absorption treatment material shown in FIG. 1.
Figure 5:
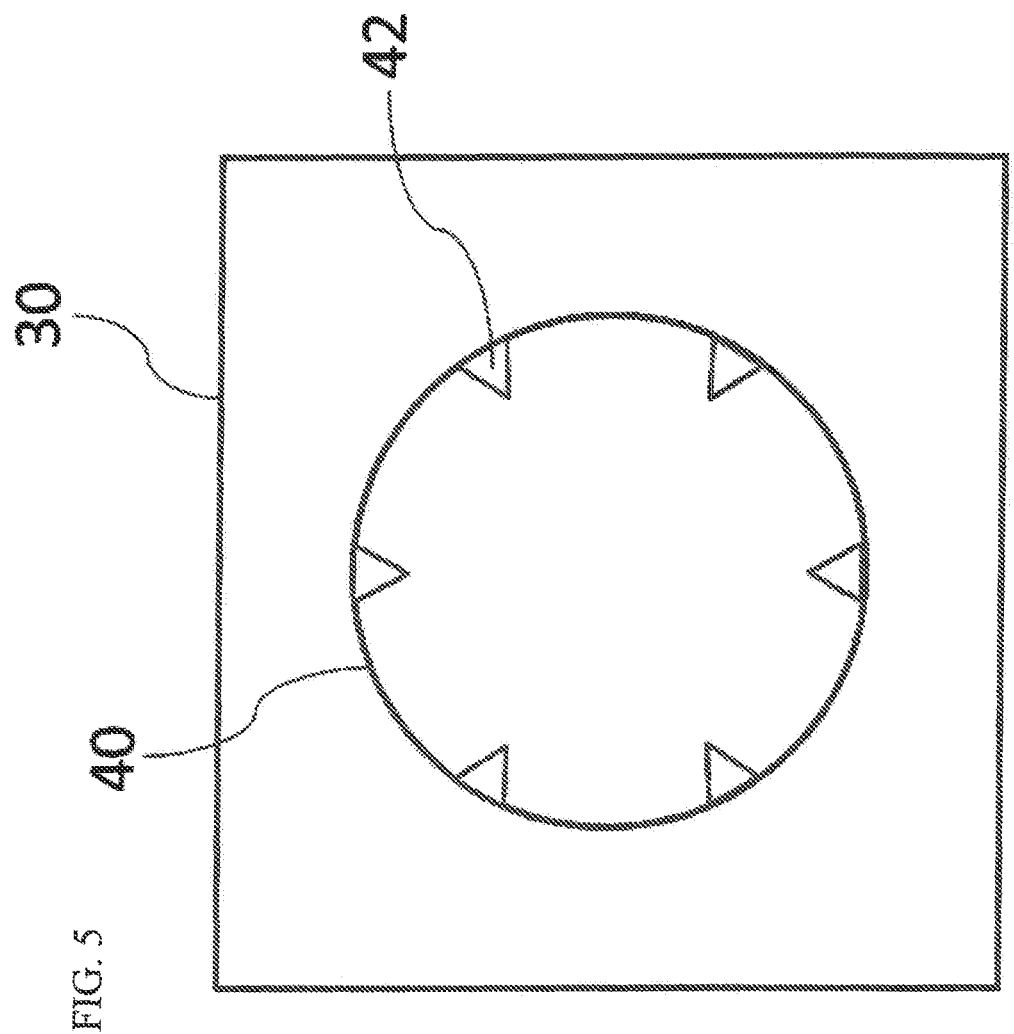
FIG. 5 is a plan view showing a portion of a die used to manufacture the water absorption treatment material shown in FIG. 1.

FIGS. 4 and 5 are a perspective view and a plan view that each show a portion of a die used for the extrusion granulation. A die 30 has a through hole 40. Note that in actuality, a plurality of through holes 40 are formed in one die 30, but only one through hole 40 is shown here. The inner surface of the through hole 40 is provided with protruding portions 42.

The protruding portions 42 are for forming the recessed portions 12. For this reason, the shapes, sizes, and positions of the protruding portions 42 are set such that the recessed portions 12 having the above-described configuration are formed. In the present embodiment, the protruding portions 42 are protrusions that extend in the thickness direction of the die 30. Multiple (specifically, six) protruding portions 42 are provided. These protruding portions 42 are aligned regularly on the inner surface of the through hole 40. Specifically, the six protruding portions 42 are provided at approximately equal intervals in the circumferential direction of the through hole 40.

Furthermore, the protruding portion 42 is provided with supply ports 44. The supply ports 44 are for supplying moisture to the core portion material passing through the through hole 40 during the extrusion granulation. The supply port 44 is constituted so as to spray moisture on the core portion material passing through the through hole 40.

In the granulation step, the core portion material is pressed into the die 30. Accordingly, the core portion material is granulated at the time of passing through the through hole 40. At this time, grooves (recessed portions 12) corresponding to the protruding portions 42 are formed on the portions of the core portion material that come into contact with the protruding portions 42. Also, moisture is supplied from the supply ports 44 to the groove portions. By cutting the granulated substance extruded from the through hole 40 to a predetermined length, the granular core portion 10 having the recessed portions 12 is obtained. Thus, in the present embodiment, the formation of the recessed portions 12 is performed at the same time as the extrusion granulation.

The embedded portion forming step is a step of forming the embedded portions 20 in the recessed portions 12 of the granular core portion 10. In this step, the material (embedded material) that constitutes the embedded portions 20 is attached to the inner surfaces of the recessed portions 12. For example, the embedded material can be attached by spraying the embedded material on the inner surfaces of the recessed portions 12 using a nozzle. Alternatively, the embedded material may be embedded in the recessed portions 12 while the granular core portion 10 is rolled. At this time, the embedded portions 20 are formed such that the entirety of each embedded portion 20 fits into a recessed portion 12. Also, each embedded portion 20 is formed in approximately the entirety of each recessed portion 12.

Thereafter, by passing the thus-obtained water absorption treatment material through a sieve, only the water absorption treatment material that satisfies a predetermined specification is extracted. Then, the extracted water absorption treatment material is dried using a dryer. According to the above description, the water absorption treatment material 1 is obtained.

Effects of the present embodiment will be described hereinafter. In the present embodiment, embedded portions 20 that contain an adhesive material are formed. Accordingly, when a piece of the water absorption treatment material 1 absorbs a liquid, it adheres to another piece of the water absorption treatment material and forms a clump. Also, the embedded portions 20 are formed in the recessed portions 12 of the granular core portion 10. For this reason, the liquid can rapidly reach the granular core portion 10 regardless of the existence of the embedded portions 20. Accordingly, the water absorption treatment material 1 and a method for manufacturing the same, according to which a clump can be formed after use without incurring a decrease in water absorptivity, are realized.

The embedded portions 20 are provided so as to completely fit into the recessed portions 12. In other words, since the embedded portions 20 do not protrude from the surface of the granular core portion 10, it is possible to suppress a case in which the embedded portions 20 separate. Separation of the embedded portions 20 causes dust during use of the water absorption treatment material 1. In contrast to this, if the embedded portions 20 protrude from the surface of the granular core portion 10, separation of the embedded portions 20 is likely to occur prior to use of the water absorption treatment material 1. In other words, this is because many pieces of the water absorption treatment material 1 are contained in a packaging container prior to use, and if the embedded portions 20 protrude from the surfaces of the granular core portions 10, the embedded portions 20 will rub against adjacent pieces of the water absorption treatment material 1 or the packaging container.

Each embedded portion 20 is provided in the entirety of each recessed portion 12. This makes it possible to prevent a level difference from appearing fax the surface of the water absorption treatment material 1. When a level difference appears, a defect or the like in the granular core portion 10 is more likely to occur at the level difference portion prior to use of the water absorption treatment material 1.

The recessed portions 12 are provided regularly on the surface of the granular core portion 10. This helps to improve the aesthetics of the water absorption treatment material 1. These regular recessed portions 12 are obtained because the recessed portions 12 are intentionally formed.

In order to sufficiently adhere pieces of the water absorption treatment material 1 together during use, it is advantageous that the regions in which the embedded portions 20 are provided are larger. From this viewpoint, on the surface of the granular core portion 10, the surface area it ratio of the portions at which the recessed portions 12 are provided with respect to the entire surface is preferably 10% or more and more preferably 20% or more. On the other hand, if the regions in which the embedded portions 20 are provided are too large, the surface area of the portions at which the granular core portion 10 is exposed to the outside of the water absorption treatment material 1 will be smaller, and water absorptivity will be impaired. From this viewpoint, the above-described surface area ratio is preferaby 90% or less, and more preferably 60% or less.

The recessed portions 12 are in the form of grooves that extend in the length direction of the granular core portion 10. The recessed portions 12 with this shape are advantageous in that they are relatively easy to form. In actuality, in the present embodiment, as described above, the recessed portions 12 are formed using a simple method of providing the protruding portions 42 on the inner surface of the through hole 40.

The multiple protruding portions 42 are provided at equal intervals in the circumferential direction on the inner surface of the through hole 40. Accordingly, during extrusion granulation, it is possible to prevent imbalance of pressure received by the core portion material from the inner surface of the through hole 40. Thus, from the viewpoint of increasing the uniformity of the pressure in the circumferential direction of the through hole 40, it is preferable that four or more protruding portions 42 are provided.

The protruding portions 42 are provided with the supply ports 44. Accordingly, moisture can be supplied in a concentrated manner to the portions of the core portion material that are in contact with the protruding portions 42, or in other words, to the portions at which the recessed portions 12 are to be formed. For this reason, in the granular core portion 10 that has just been formed through extrusion granulation, a large amount of moisture is held in the recessed portions 12 compared to other portions. By thus providing a difference in the amount of moisture between the recessed portions 12 and the other portions, it is easier to selectively attach the embedded material in the recessed portions 12. Note that it is not essential to provide the supply ports 44 in the protruding portions 42.

Incidentally, the used water absorption treatment material 1 needs to be disposed of, and convenience for the user is increased if disposal can be performed by flushing the water absorption treatment material 1 in a flushing toilet. In order to perform disposal by thus flushing in a flushing toilet, it is required that the water absorption treatment material 1 has sufficient water-solubility (a property in which bonded fibers and particles rapidly separate and dissolve in water due to coming into contact with water).

In this respect, the conventional water absorption treatment material has been problematic in that the granular core portion is covered with a coating layer portion, which incurs a decrease in water-absorptivity as well as a decrease in water-solubility. This is because the coating layer portion blocks the water of the flushing toilet from reaching the granular core portion. In the present embodiment, the embedded portions 20 are provided in the recessed portions 12, and the granular core portions 10 are exposed at portions other than the recessed portions 12, and therefore it is possible to eliminate the problem.

If the adhesive material is a water-absorptive polymer, the problem of the decrease in water-solubility of the conventional water absorption treatment material is more prominent. This is because water-absorptive polymers have a property of expanding during liquid absorption, and when the water-absorptive polymer swells in the coating layer portion, the water of the flushing toilet is further blocked from reaching the granular core portion. For this reason, in such a case, the water absorption treatment material 1 that can prevent a decrease in water-solubility is particularly useful.

Figure 6:
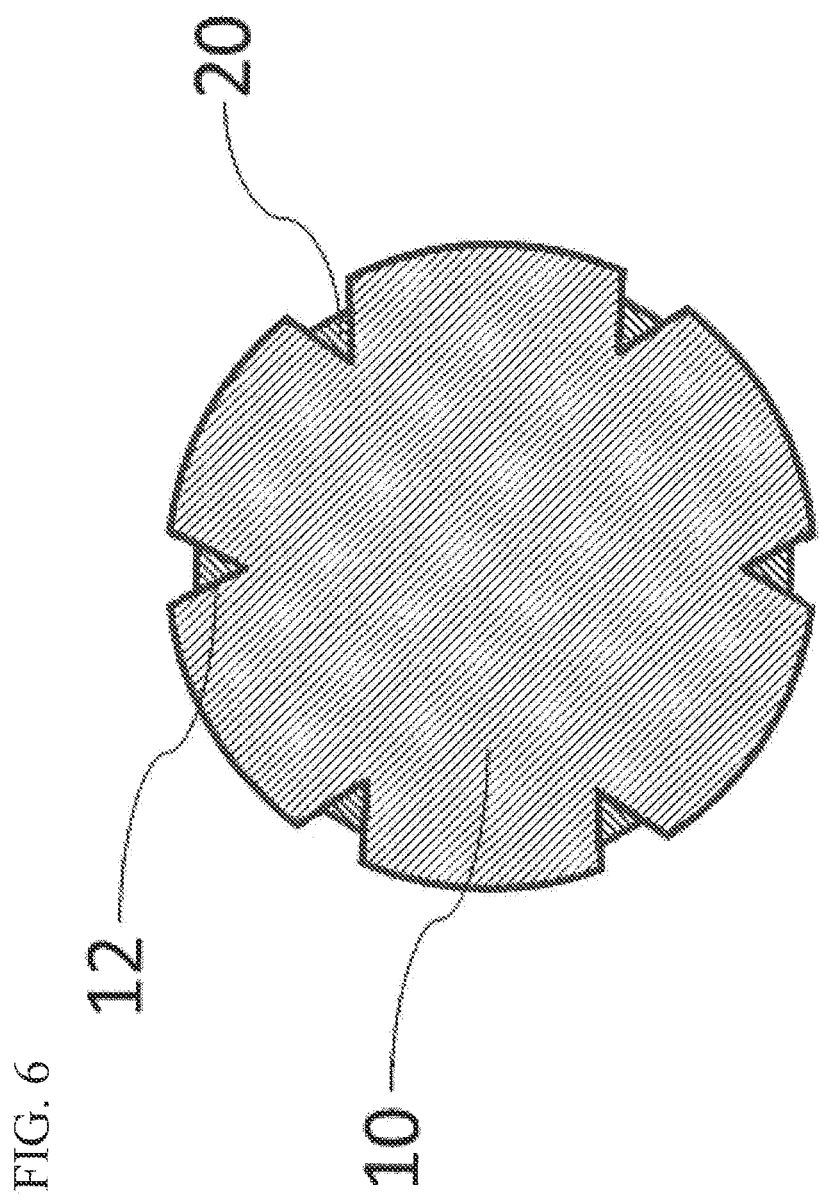
FIG. 6 is a cross-sectional view illustrating a modified example of an embedded portion.

The present invention is not limited to the above-described embodiment, and various modifications are possible. The above-described embodiment showed an example in which the embedded portions 20 are formed in approximately the entirety of each recessed portion 12. However, as shown in FIG. 6, the embedded portions 20 may be provided in only a portion of each recessed portion 12.

Figure 7:
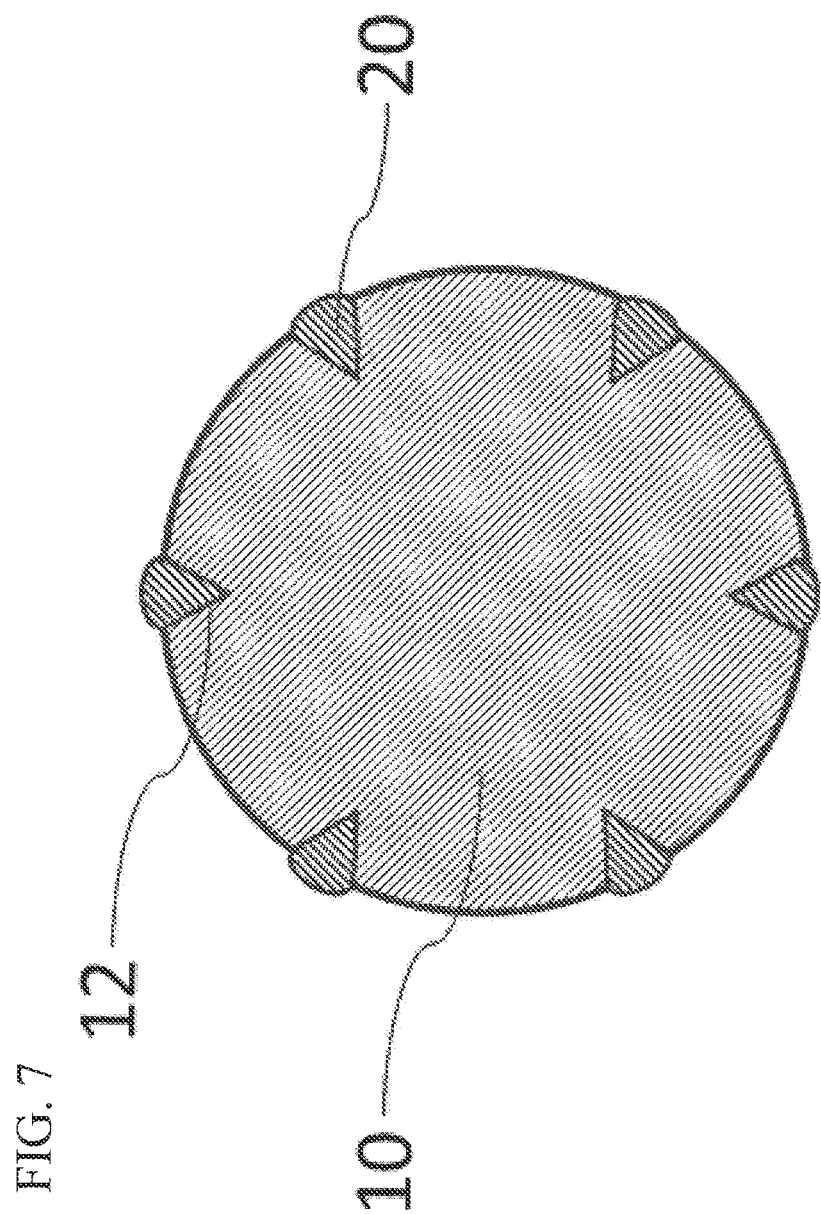
FIG. 7 is a cross-sectional view illustrating another modified example of an embedded portion.
Figure 8:
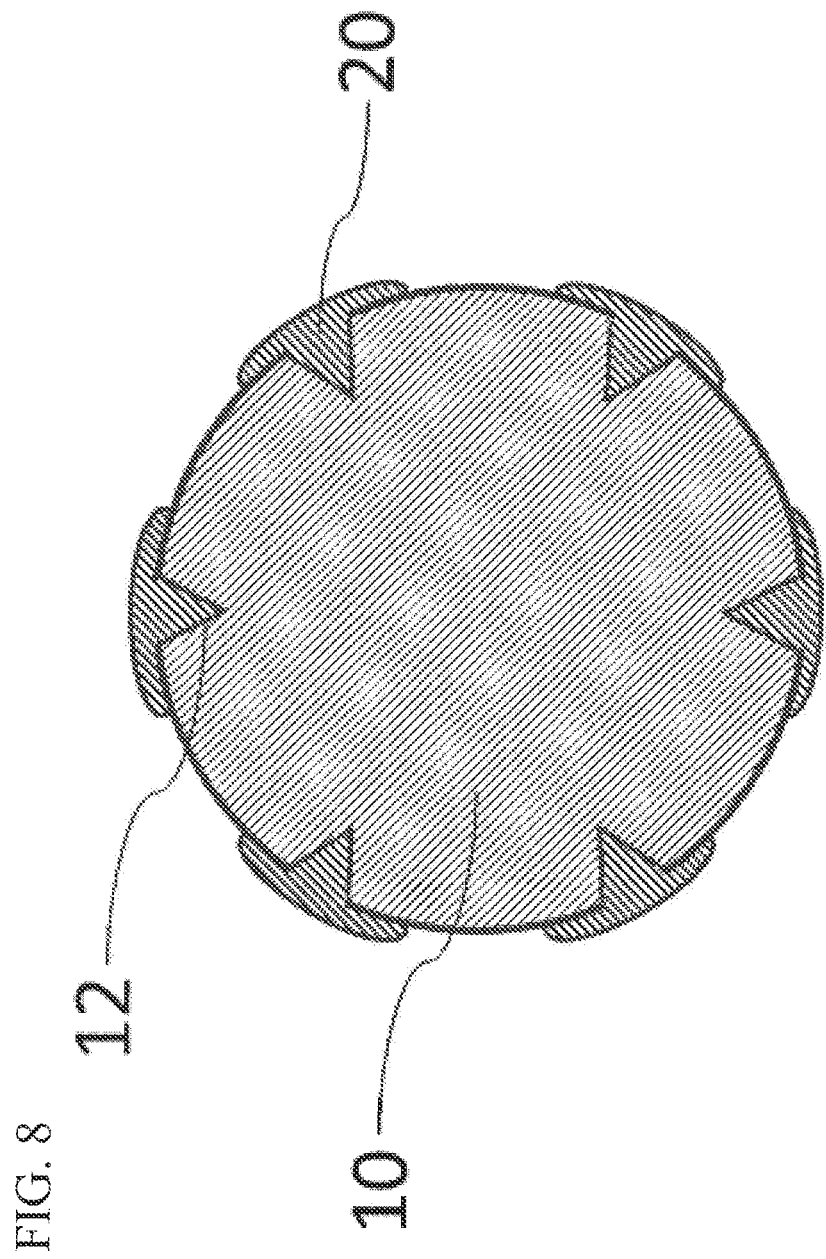
FIG. 8 is a cross-sectional view illustrating another modified example of an embedded portion.

The above-described embodiment illustrated an example in which the entirety of each embedded portion 20 fits into a recessed portion 12. However, as shown in FIGS. 7 and 8, the embedded portions 20 may protrude to the outside of the recessed portions 12. In FIG. 7, the portions of the embedded portions 20 that protrude from the recessed portions 12 exist only over the recessed portions 12. On the other hand, in FIG. 8, the portions of the embedded portions 20 that protrude from the recessed portions 12 exist over the recessed portions 12 as well as on regions of the surface of the granular core portion 10 at which no recessed portion 12 is provided.

Figure 9:
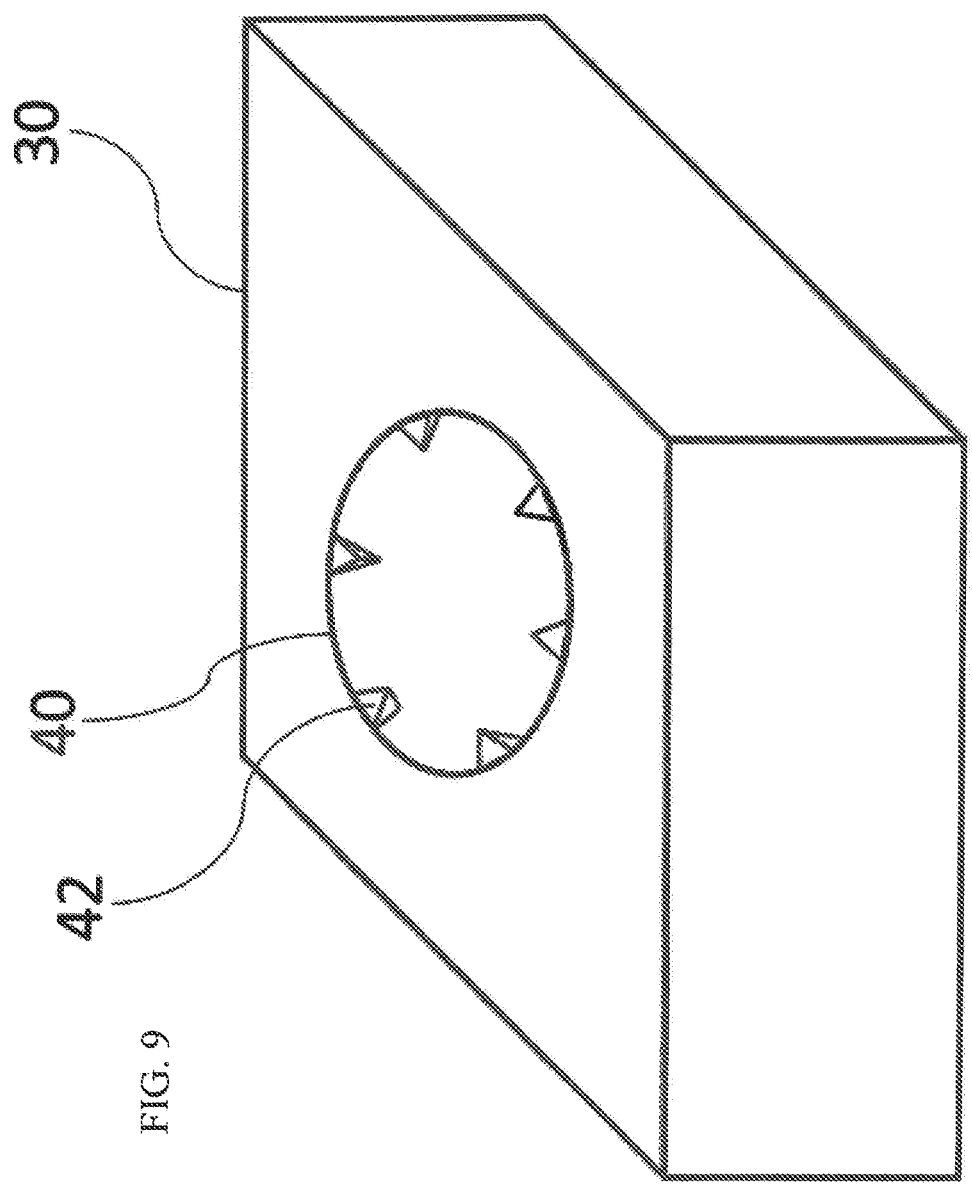
FIG. 9 is a perspective view illustrating a modified example of a protruding portion provided in a through hole of a die.
Figure 10:
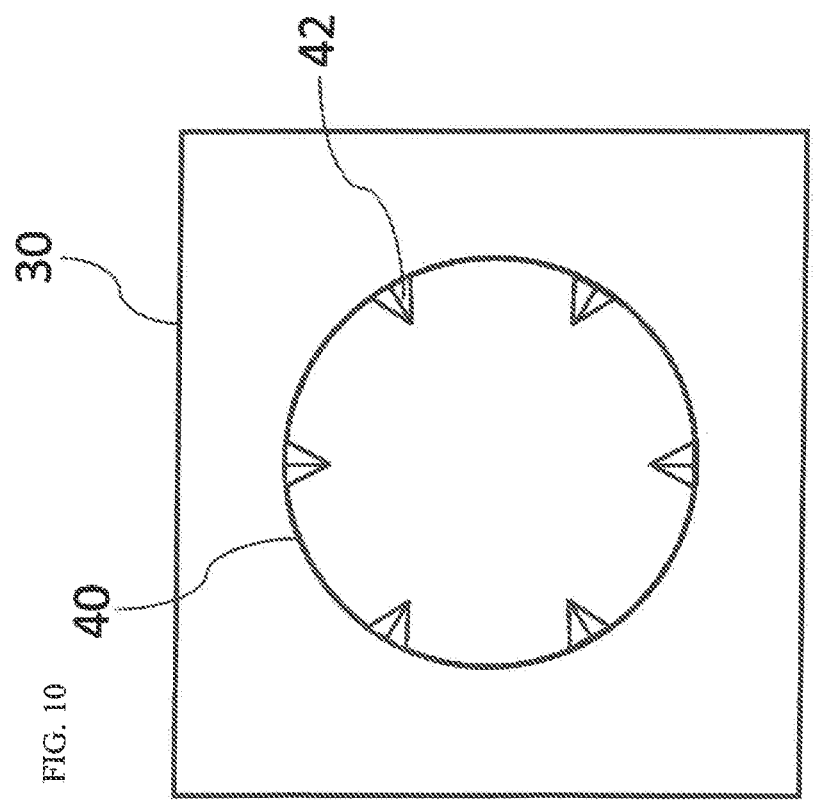
FIG. 10 is a plan view illustrating a modified example of a protruding portion provided in the through hole of the die.

In the above-described embodiment, protruding portions 42 composed of protrusions that extend in the thickness direction of the die 30 were illustrated. However, as shown in FIGS. 9 and 10, the protruding portions 42 may be composed of projections provided near the exit of the through hole 40. FIG. 9 is a perspective view from the exit side of the through hole 40, and FIG. 10 is a plan view from the entrance side of the through hole 40. In these drawings, protruding portions 42 that are composed of projections in the form of approximate triangular pyramids are shown. It is possible to form recessed portions 12 having the above-described configuration using protruding portions 42 with this shape as well.

Figure 11:
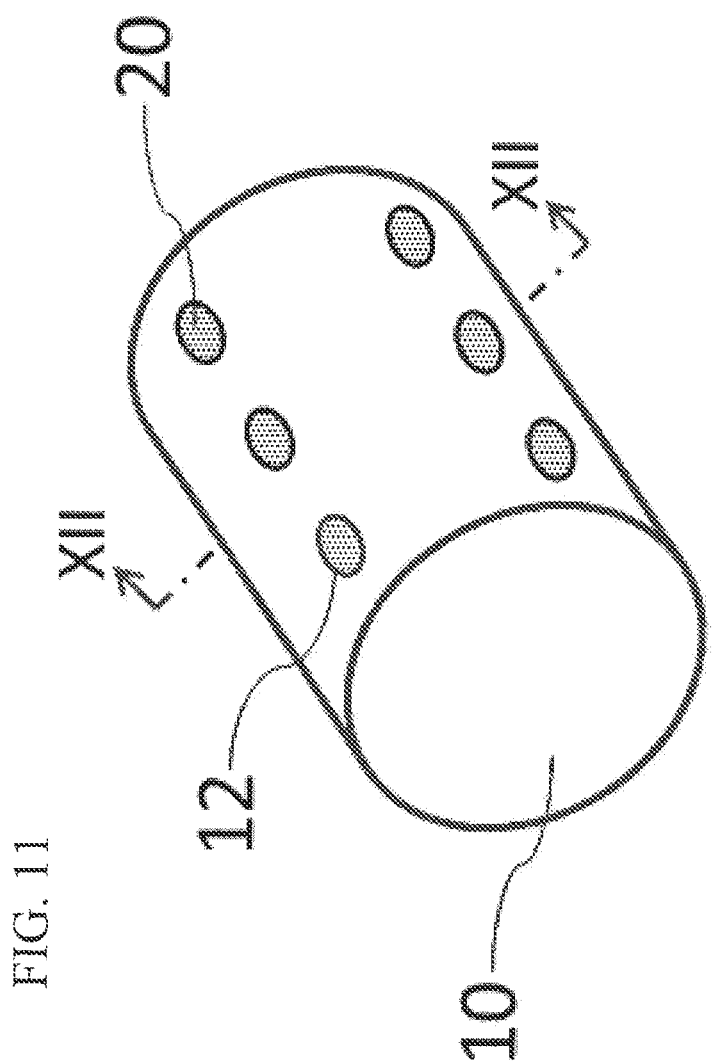
FIG. 11 is a perspective view illustrating a modified example of the recessed portion.
Figure 12:
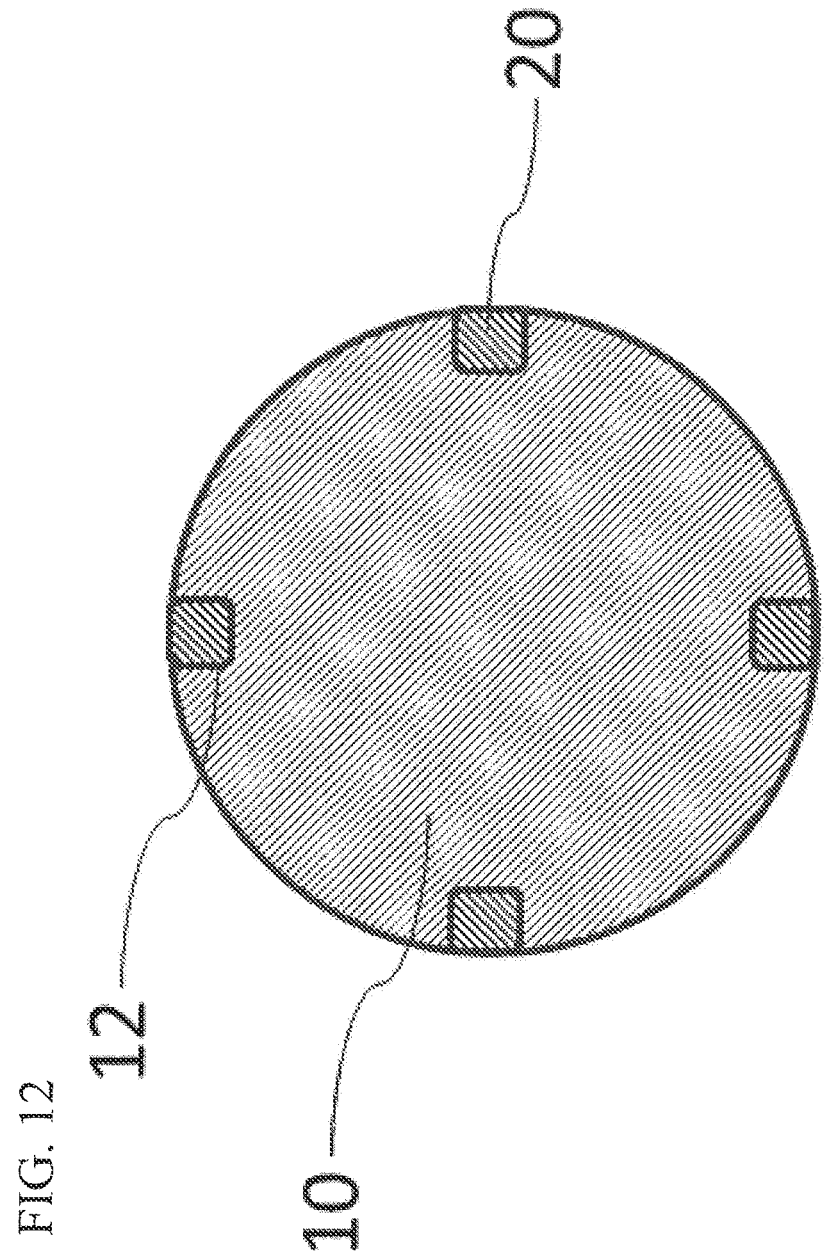
FIG. 12 is a cross-sectional view taken along line XII-XII shown in FIG. 11.

The above-described embodiment illustrated groove-shaped recessed portions 12. However, as shown in FIGS. 11 and 12, the recessed portions 12 may be spot-shaped in plan view. FIG. 12 shows a cross section taken along shown in FIG. 11.

Figure 13:
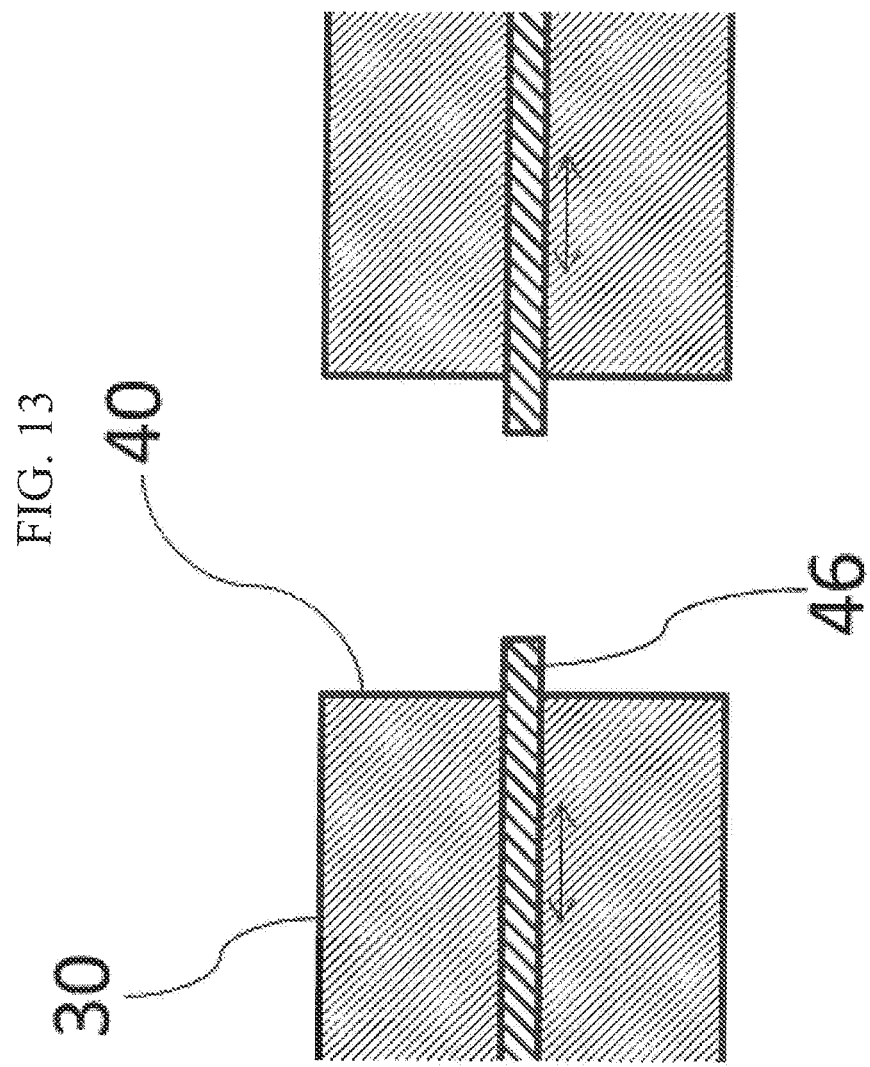
FIG. 13 is an end surface view showing a portion of a die used to manufacture the water absorption treatment material shown in FIG. 11.
Figure 14:
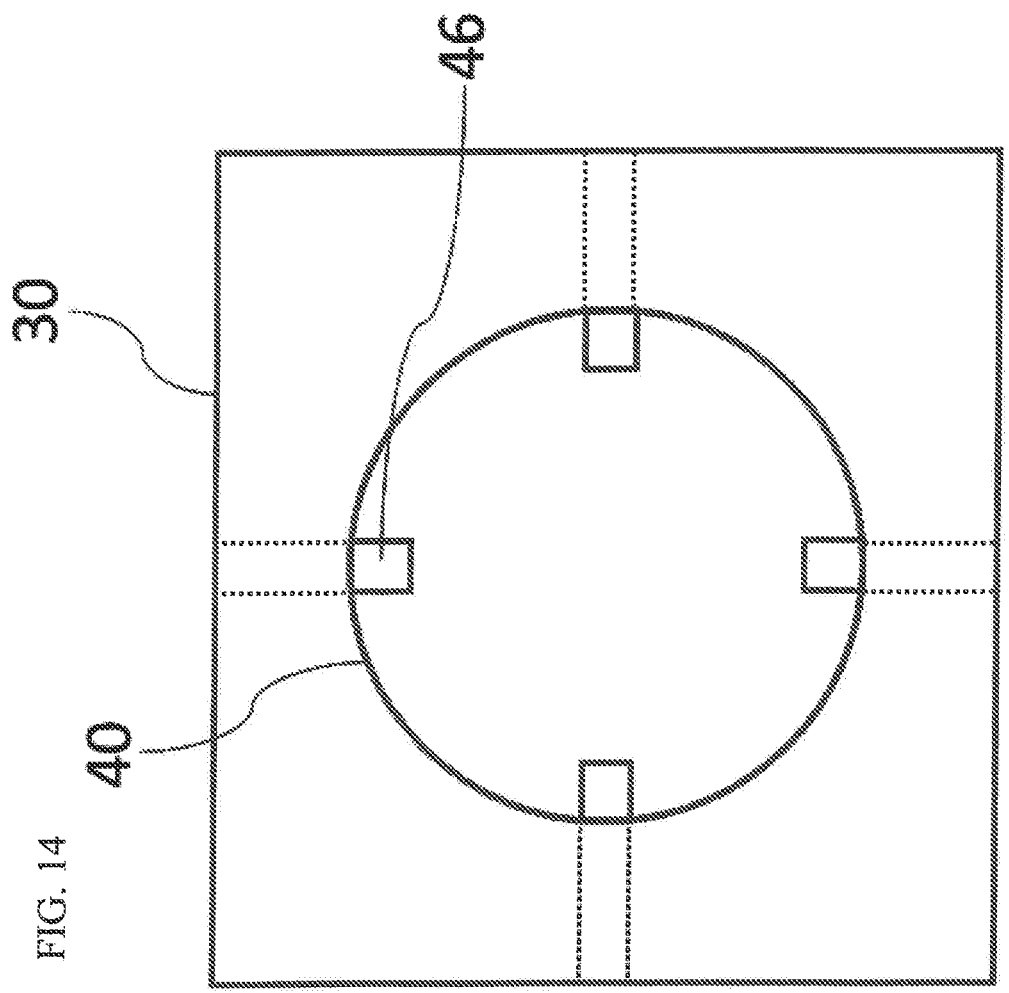
FIG. 14 is a plan view showing a portion of a die used to manufacture the water absorption treatment material shown in FIG. 11.
Figure 15:
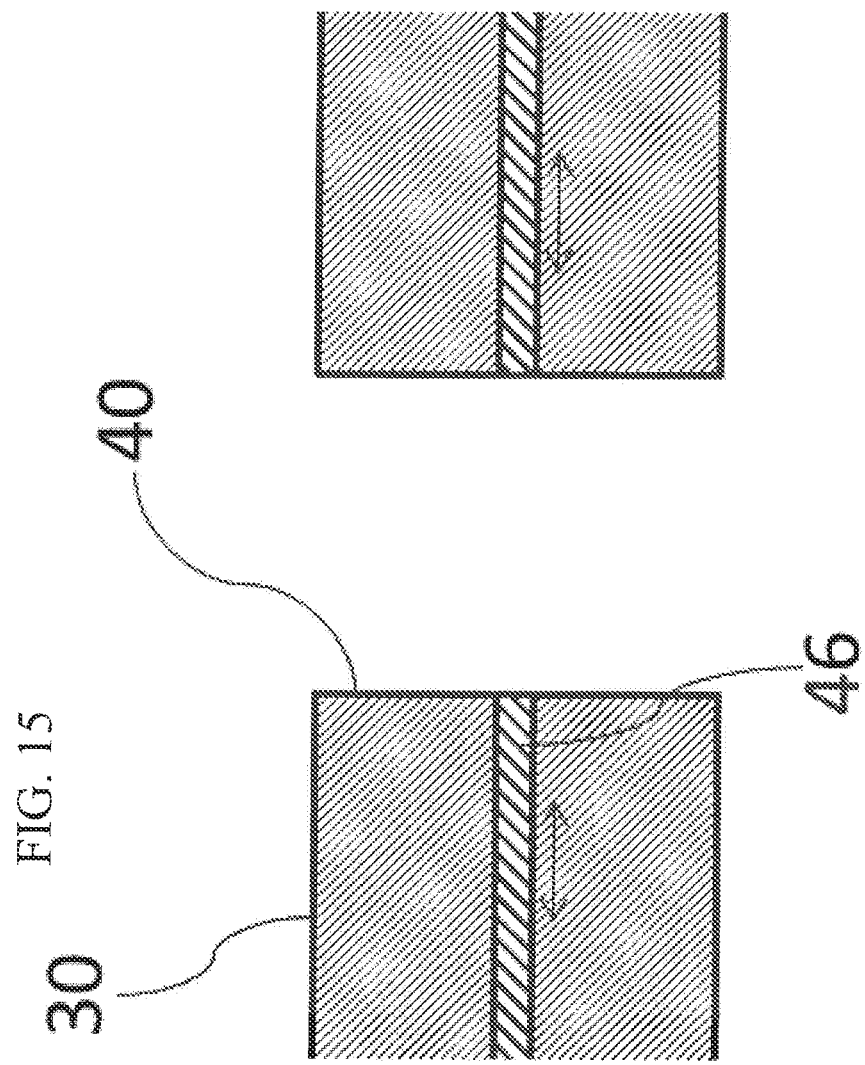
FIG. 15 is an end surface view showing a portion of a die used to manufacture the water absorption treatment material shown in FIG. 11.
Figure 16:
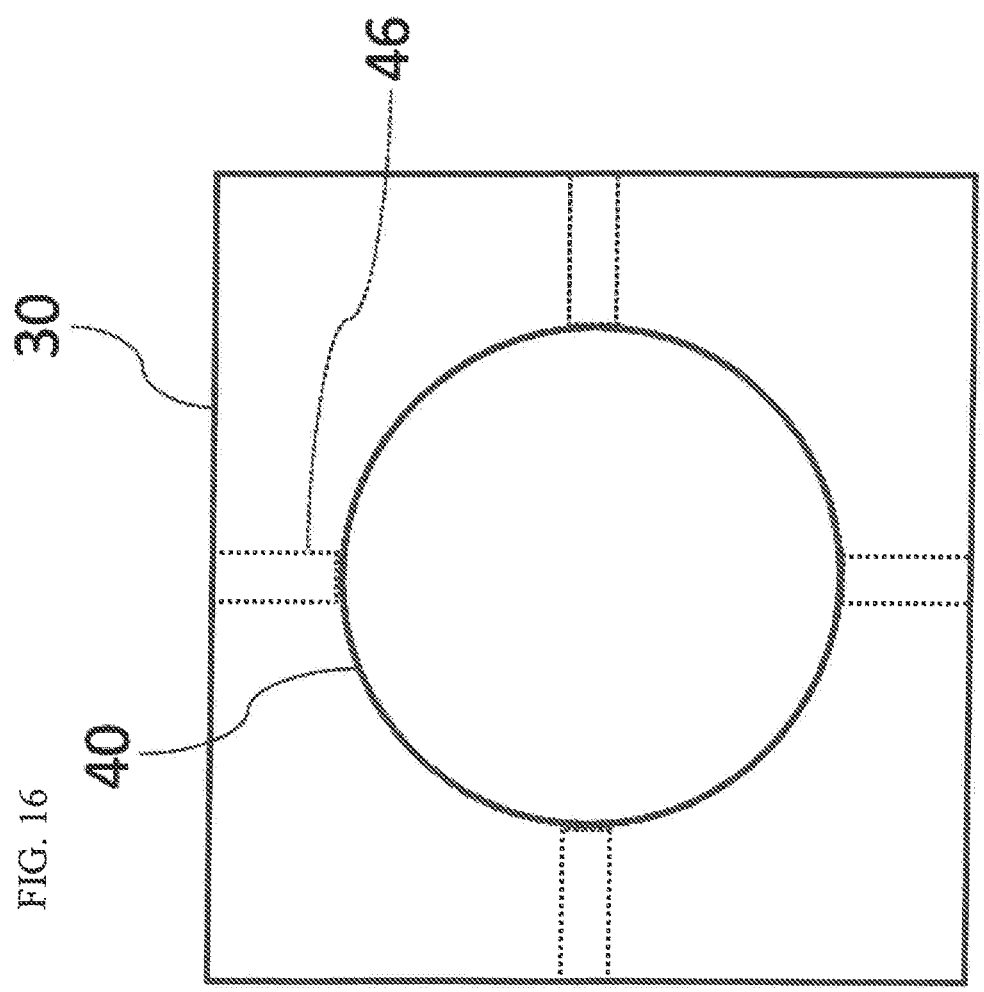
FIG. 16 is a plan view showing a portion of a die used to manufacture the water absorption treatment material shown in FIG. 11.

The spot-shaped recessed portions 12 can be formed using a die 30 having the following configuration, for example. That is, as shown in FIGS. 13 to 16, rod-shaped members 46 are provided in the through hole 40 of the die 30. The rod-shaped members 46 are constituted so as to move reciprocally along the radial direction (direction indicated by the arrows in FIGS. 13 and 15) of the through hole 40. FIGS. 13 and 14 show a state at a time when the rod-shaped members 46 are the closest to the central axis of the through hole 40. At this time, the leading ends of the rod-shaped members 46 are located between the inner surface of the through hole 40 and the central axis of the through hole 40. In other words, the rod-shaped members 46 protrude from the inner surface of the through hole 40. On the other hand, FIGS. 15 and 16 show a state at a time when the rod-shaped members 46 are the farthest from the central axis of the through hole 40. At this time, the leading ends of the rod-shaped members 46 are located at the inner surface of the through hole 40.

When the core portion material passes through the through hole 40 during extrusion granulation, the spot-shaped recessed portions 12 shown in FIGS. 11 and 12 can be formed by intermittently causing the rod-shaped members 46 to protrude from the inner surface of the through hole 40. Note that the rod-shaped members 46 that move reciprocally may be provided outside of the die 30 instead of inside of the die 30.

The above-described embodiment illustrated recessed portions 12 that were intentionally formed on the surface of the granular core portion 10. However, the recessed portions may be formed unintentionally on the surface of the granular core portion 10. Here, an "unintentionally formed" recessed portion refers to a recessed portion other than an intentionally formed recessed portion. For example, although sometimes a crack or the like is formed in the granular core portion 10 due to accidental or inevitable causes in the step of manufacturing the water absorption treatment material, the shape, size, and position of the crack or the like cannot be controlled, and thus a crack or the like corresponds to an "unintentionally formed" recessed portion.

The above-described embodiment showed an example in which multiple recessed portions 12 are formed. However, it is also possible to provide only one recessed portion 12. The same follows for the protruding portions 42 provided in the through hole 40.

The above-described embodiment illustrated an approximately columnar granular core portion 10. However, the shape of the granular core portion 10 need only be granular, and may be a sphere or an ellipsoid.

LIST OF REFERENCE NUMERALS

1 Water absorption treatment material
10 Granular core portion
12 Recessed portion
20 Embedded portion.
30 Die
40 Through hole
42 Protruding portion
44 Supply port
46 Rod-shaped member

The invention claimed is:

1. A water absorption treatment material comprising:
   a granular core portion having a recessed portion on its surface; and
   an embedded portion that is provided in the recessed portion and contains an adhesive material,
   wherein the granular core portion is exposed to the outside of the water absorption treatment material at a portion at which the recessed portion is not provided.

2. The water absorption treatment material according to claim 1, wherein
   the entirety of the embedded portion is provided so as to fit in the recessed portion.

3. The water absorption treatment material according to claim 1, wherein
   the embedded portion is provided in approximately the entirety of the recessed portion.

4. The water absorption treatment material according to claim 1, wherein
   the granular core portion is approximately cylindrical, and
   the recessed portion is groove-shaped and extends in a length direction of the granular core portion.

5. The water absorption treatment material according to claim 4, wherein
the recessed portion extends along the entirety of the length direction of the granular core portion.

6. The water absorption treatment material according to claim 1, wherein
the granular core portion has a plurality of said recessed portions, and
the plurality of recessed portions are arranged regularly on the surface of the granular core portion.

7. The water absorption treatment material according to claim 1, wherein
the recessed portion is intentionally formed on the surface of the granular core portion.

8. The water absorption treatment material according to claim 1, wherein
on the surface of the granular core portion, a surface area ratio of the portion at which the recessed portion is provided with respect to the entire surface is 10% or more and 90% or less.

9. The water absorption treatment material according to claim 8, wherein
the surface area ratio is 20% or more and 60% or less.

10. The water absorption treatment material according to claim 1, wherein
the adhesive material is a water-absorptive polymer.

* * * * *